United States Patent
Brecht

(10) Patent No.: US 10,703,514 B2
(45) Date of Patent: Jul. 7, 2020

(54) METERING ROLLER

(71) Applicant: Harro Hoefliger Verpackungsmaschinen GmbH, Allmersbach im Tal (DE)

(72) Inventor: Sven Brecht, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 16/533,349

(22) Filed: Aug. 6, 2019

(65) Prior Publication Data
US 2020/0047924 A1 Feb. 13, 2020

(30) Foreign Application Priority Data
Aug. 8, 2018 (EP) .................................... 18188048

(51) Int. Cl.
| B65B 1/36 | (2006.01) |
| B65B 1/04 | (2006.01) |
| G01F 11/24 | (2006.01) |

(52) U.S. Cl.
CPC ............... B65B 1/36 (2013.01); B65B 1/04 (2013.01); G01F 11/24 (2013.01)

(58) Field of Classification Search
CPC .. B65B 1/36; B65B 1/04; B65B 37/08; B65B 37/20; B65B 1/363; G01F 11/24
See application file for complete search history.

(56) References Cited

U.S. PATENT DOCUMENTS

| 2005/0023288 | A1* | 2/2005 | Zill | ........................... B65B 1/16 222/1 |
| 2005/0023297 | A1* | 2/2005 | Zill | ........................... B65B 1/16 222/250 |
| 2014/0353260 | A1* | 12/2014 | Harkonen | ............ B01D 33/463 210/770 |
| 2015/0217879 | A1* | 8/2015 | Wolf | ....................... B65B 37/08 141/11 |
| 2020/0047924 | A1* | 2/2020 | Brecht | ..................... G01F 11/24 |

FOREIGN PATENT DOCUMENTS

| DE | 20118915 U1 | 3/2003 |
| DE | 202007014478 U1 | 12/2007 |
| DE | 102017204083 A1 | 9/2018 |
| EP | 2 902 327 A1 | 8/2015 |

\* cited by examiner

*Primary Examiner* — David P Angwin
*Assistant Examiner* — Bob Zadeh
(74) *Attorney, Agent, or Firm* — Walter Ottesen, P.A.

(57) ABSTRACT

A metering roller is for filling a vessel with a portion of a powder product to be metered. The metering roller includes a roller jacket, a filter element, a filter strip, a seal and a clamping core. The roller jacket defines at least one metering opening completely penetrating the roller jacket from its outer side to its inner side, the metering opening being delimited on the inside via a filter element. The filter element is pressed by the clamping core via the filter strip against the inner side of the roller jacket. The seal is arranged between the filter element and the filter strip, the metering opening being exposed to a negative pressure through the filter element via at least one pressure channel in the filter strip. The seal seals a connection of the pressure channel to the metering opening. The seal is an elastomer cured onto the filter strip.

7 Claims, 2 Drawing Sheets

METERING ROLLER

CROSS REFERENCE TO RELATED APPLICATION

This application claims priority of European patent application no. 18 188 048.5, filed Aug. 8, 2018, the entire content of which is incorporated herein by reference.

BACKGROUND OF THE INVENTION

Powders which have to be supplied in precise, measured portions or metered quantities are processed in the pharmaceutical sector, for example, but also in the field of nutritional supplements or the like. Target vessels in the form of blister packs, two-piece capsules, or the like, for example, are filled with measured metered quantities of this kind of a powder product so that the consumer has available and is able to take, corresponding unit doses.

Powder products of this kind are, in particular, conveyed to so-called roller metering devices in individually measured metered quantities which are then decanted into target vessels which have been assigned in each case. A roller metering device of this kind includes a metering roller with a roller jacket which is provided with at least one, usually with a plurality of, metering openings on the circumference, wherein the metering openings are delimited on the inside via a filter element. The filter element is pressed by a clamping core via a filter strip against the inner side of the roller jacket. A pressure channel is arranged in the filter strip, via which the metering opening can be exposed to a negative pressure through the filter element.

Powder is drawn into the metering openings under the action of the negative pressure with metered quantities of the powder being formed, the volume whereof corresponding to the volume of the respective metering opening. The metered quantities formed in such a manner are then ejected from the metering openings and relayed to the target vessel.

It is clear from the preceding comments that the metering which involves a roller metering device is volumetric metering. What is usually the objective, however, is metering in which the measured metered volume has a particular mass within a permitted tolerance range. It has been shown in practice that the metered quantities supplied volumetrically by a roller metering device do not always meet the requirements in terms of the mass actually achieved. Particularly when metering powder products with poor flow properties there are in some cases large deviations from the target mass of the volumetrically supplied metered quantity and therefore a large dispersion of metered masses.

With simple embodiments in the prior art, the filter elements are clamped directly between the filter strip and the roller jacket without additional seals. Sealing elements which are positioned on the side of the filter strip facing the filter elements are used when there are greater requirements. In a configuration known in the art, a seal of this kind is created by a self-adhesive foam pad which is adhered to the filter strip. Such pads are only of limited durability. As time passes, the pads lose elasticity and therefore have to be replaced or removed and disposed of. Alternatively, silicon rings are used in the state of the art, for which complex mounting and positioning aids and also licensed silicon adhesives are required.

SUMMARY OF THE INVENTION

It is an object of the invention to provide a metering roller configured such that the individual masses produced by the metering roller can easily be kept within a predetermined tolerance range.

This object can, for example, be achieved via a metering roller for filling a target vessel with a portion of a powder product to be metered. The metering roller includes: a roller jacket having an inner side and an outer side; a filter element; a filter strip; a seal; a clamping core; the roller jacket defining at least one metering opening completely penetrating the roller jacket from the outer side to the inner side; the at least one metering opening being delimited inside via the filter element; the filter element being pressed by the clamping core via the filter strip against the inner side of the roller jacket; the seal being arranged between the filter element and the filter strip; the at least one metering opening being exposed to a negative pressure through the filter element via at least one pressure channel in the filter strip; the seal sealing a connection of the at least one pressure channel to the metering opening; and, the seal being an elastomer cured onto the filter strip.

The disclosure is initially based on the realization that unwanted fluctuations in the metered masses actually achieved, particularly when metering powders with poor flow properties, are attributable to inaccuracies in the supply of the effective negative intake pressure. Greater accuracy is achieved by a seal which is an elastomer cured onto the filter strip. In this way, the seal forms a substance-bonded connection with the filter strip on its side facing the filter strip. This improves the tightness in respect of gases, in particular in respect of compressed air, between the filter strip and seal. In this way, a precisely adapted negative pressure can be generated in the chamber in a repeatable manner, the negative pressure always ensuring a likewise repeatable filling level, even when the metering opening is filled with fluid-like powders with poor flow properties. The metered masses actually achieved are also homogenized via the repeatable homogenization of the filling level.

At the same time, the seal is held on the filter strip in a captive manner. The assembly and dismantling of the filter strip and seal are made simpler by comparison with the prior art, since the use of an adhesive is dispensed with. Assembly errors are avoided, which helps with process reliability.

The cured-on elastomer can easily be processed on its side facing away from the filter strip on account of its fixed connection to the filter strip. Hence, by processing this side, the thickness of the seal, for example, can be adapted to the space available between the filter strip and the inside of the roller jacket by removing a corresponding layer. This may involve grinding, in particular. By using a cured-on elastomer as the seal, the seal on the side of the seal facing the inside of the roller jacket can also be adapted to the profile of the inside of the roller jacket in such a manner that an outstanding seal of the connection between the pressure channel and the metering opening results.

Because the seal is a cured-on elastomer, the sealing effect during repeated filling actions of one and the same metering opening is comparable. Consequently, the negative pressure achieved in the metering opening when there are multiple consecutive filling actions is also comparable. Contrary to the prior art in which the quality of the adhesive connection between the sealing pad and the filter strip and also the elasticity of the sealing pad diminish with time, it is thereby guaranteed that the negative pressure acting in the metering opening, and therefore also the metered mass of the powder product drawn into the metering opening, always fall within a desired tolerance range.

In addition, dispensing with adhesive is advantageous, particularly in the food supplement and pharmaceutical industry where particular attention must be paid to a high standard of purity of the end product reaching the target vessel.

In an embodiment, the cured-on elastomer extends over a total connection surface of the filter strip facing the inner side of the roller jacket and is only pierced by a hole in each case for the fluidic connection of the pressure channel to a metering opening. The seal can easily be produced in this way. The number and spacing of the holes can be freely selected. In this way, the seal can be used for a vast array of geometries without having to be specially prefabricated.

Advantageously, in a region about a channel opening, which is arranged at an end of the pressure channel facing the inside of the roller jacket, the cured-on elastomer has a pressure surface for abutting the inside of the roller jacket which projects in the direction of the inside of the roller jacket. In this way, the seal may abut the inside of the roller jacket with a defined bearing surface.

The filter strip can advantageously include at least two channel openings which lie alongside one another in the direction of the rotational axis of the roller jacket. This means that at least two metering openings can be filled at the same time. The at least two channel openings advantageously open into the same pressure channel. In this way, the at least two channel openings and the associated metering openings can be acted upon by negative pressure from the same negative pressure source. By using a cured-on elastomer as the seal in at least two channel openings and at least two metering openings, the quality of the seal on the at least two channel openings is highly comparable. This means that the pressures in the at least two metering openings which are generated by a single negative pressure source are also practically the same. Subsequently, the metered masses of the metered quantities of the powder product decanted in the same volumes from the at least two channel openings are likewise very similar.

In an embodiment, the pressure surfaces of the cured-on elastomer have a rectangular configuration. This means that the pressure surfaces for abutment with adjacent metering openings in the direction of the rotational axis of the metering roller can easily be produced. For this purpose, material must be removed only between two adjacent channel openings on the side of the cured-on elastomer facing away from the filter strip. In the direction perpendicular to the rotational axis of the metering roller, material can be removed over the entire width of the filter strip. This makes the pressure surfaces easier to produce.

The cured-on elastomer can advantageously be a synthetic rubber, in particular nitrile rubber. The cured-on elastomer can particularly advantageously be silicon.

The filter strip can advantageously be made of aluminum. This produces a fixed connection between the elastomer and the filter strip.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
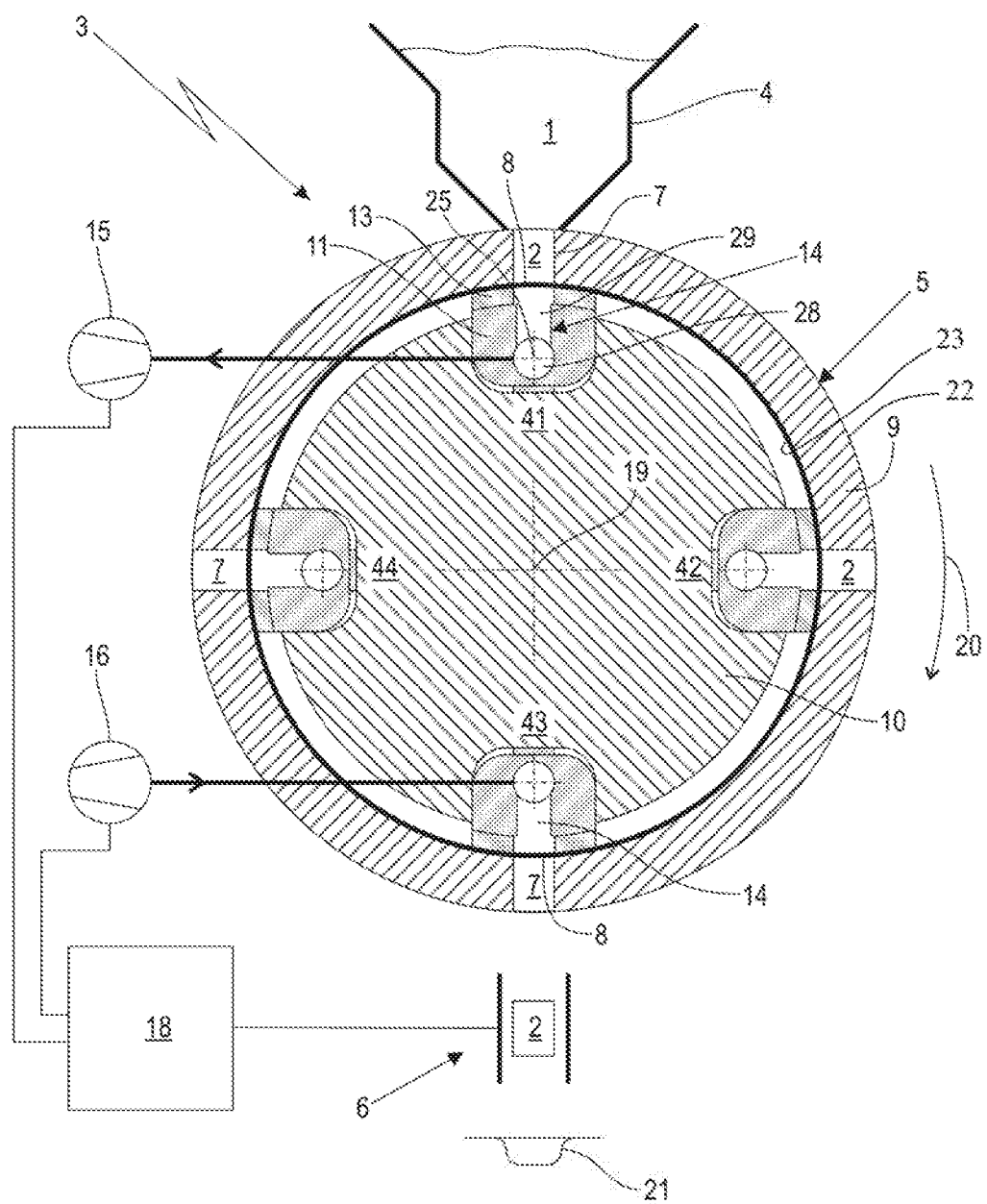
FIG. 1 shows a roller metering device having a metering roller with a roller jacket and filter strips with a seal via which a filter element is pressed via a clamping core against an inside of the roller jacket in a schematic cross-sectional depiction.

FIG. 1 shows in a schematic cross-sectional depiction a roller metering device 3 during the production of individual metered quantities 2 of a powder product 1 and for the movement of individual metered quantities 2 of this kind into a target vessel 21. The powder product in this case is a pharmaceutical powder. However, it may also be a food additive, or the like, in powder form. The target vessel 21 in this case is a schematically indicated blister pack which is sealed with a cover film once it has been filled. However, two-piece capsules or other vessels are also possible choices as the target vessel 21.

The roller metering device 3 includes a product store 4, a metering roller 5, and a measuring device 6. The powder product 1 is held in the funnel-shaped product store 4 ready for measuring. Portions of the powder product 1 are removed from the product store 4 via the metering roller and volumetrically accurately defined metered quantities 2 are formed therefrom. A subsequent mass determination of individual, in particular of all, metered quantities 2 takes place via the measuring device 6.

The metering roller 5 extends along a longitudinal axis and is substantially cylindrical in configuration in respect of this longitudinal axis. The metering roller 5 has at least one metering opening 7 on the circumference. In the preferred embodiment shown, the metering roller 5 is provided with a plurality of metering openings 7. Although it cannot be seen in the cross-sectional depiction shown here, three to twelve metering openings 7 in each case form a series of openings which runs in an axis-parallel manner to a rotational axis 19 of the metering roller 5. Four series of openings of this kind are positioned in the circumferential direction 20 of the metering roller 5 about the rotational axis 19 at the same angular intervals, so at 90° to one another. Of the aforementioned series of openings, one of each of them, so a total of four metering openings 7, can be identified in this case. In the axial direction and/or in the circumferential direction, however, different numbers of metering openings 7 may also be appropriate.

The metering roller 5 has a central clamping core 10 and a roller jacket 9 enclosing the clamping core 10 at a radial distance. The roller jacket 9 is a hollow cylindrical jacket body. The metering opening 7 is configured as a hole with a circular outline which passes through the roller jacket 9 radially. However, other outline shapes may also be appropriate. For example, the outline shape may be only partially round, oval, polygonal, rectangular or square. The metering opening 7 is open radially outwardly, so on one outer side 22 of the roller jacket 9. Radially inwardly, so on an inner side 23 of the roller jacket 9, the metering opening 7 is delimited via a filter element 8 which corresponds in size and shape to the cross section of the metering opening 7 and forms the base thereof.

Corresponding to the number of the aforementioned series of openings, the clamping core 10 has a number of receiving grooves extending in an axis-parallel manner to the rotational axis 19, in each of which a filter strip 11 is held. A seal 13 is fitted between the filter strip 11 and the inner side 23 of the roller jacket 9.

A branched pressure channel 14 is formed in each of the filter strips 11, which pressure channel opens out through the filter elements 8 into corresponding metering openings 7.

The pressure channel 14 includes a main channel 28 and at least one branch 29. In the embodiment, the pressure channel 14 includes twelve branches 29 corresponding to an appropriate number of metering openings 7 within an axis-parallel row thereof. The main channel 28 extends along a longitudinal axis 25 of the pressure channel 14. The longitudinal axis 25 runs parallel to the rotational axis 19 of the metering roller 5. The branches 29 of the pressure channel 14 extend radially in relation to the rotational axis 19 up to the metering openings 7 starting from the main channel 28.

The filter elements 8 are jointly formed by a sheet of suitable filter material which is wound about the clamping core 10 with the filter strips 11. Adhered filter elements 8 may also be used. The filter strips 11 are clamped radially outwardly via a clamping cone which is not shown with the filter material inserted in between against the inside of the roller jacket 9. The seals 13 in this case firstly press the filter material against the inside of the roller material and secondly seal the associated branch 29 of the pressure channel 14, and also the respective metering opening 7, in respect of the surrounding area around the filter element 8 in each case. It is thereby ensured that pressure compensation between the metering opening and the pressure channel 14 takes place simply through the associated filter element 8 and that the metering openings 7 can therefore be exposed to a particular desired pressure via the associated pressure channel 14 by the respective filter element 8.

The metering roller 5 is mounted rotatably about the rotational axis 19 in the direction of an arrow 20 and provided with an associated rotary drive which is not shown here. During operation, the metering roller 5 is rotated in a clocked manner, wherein the individual metering openings 7 come to rest in at least two cycles cyclically in an upper filling position 41 in the gravitational direction and a lower ejection position 43 in the gravitational direction. Rather than a clocked movement, a continuous rotation may also be appropriate. In the embodiment shown, the individual metering openings 7 pass through four different positions cyclically in four cycles, starting with the upper filling position 41, followed by a first intermediate position 42. These are followed by the lower ejection position 43 and a second intermediate position 44, before the cycle begins again at the upper filling position 41. In the upper filling position 41, the metering opening 7 in each case is filled with the powder product 1 from the product store 4, creating a metered quantity 2. In the following first intermediate position 42, a level check may optionally be carried out. In the lower ejection position 43, the metered quantity 2 is ejected from the metering opening 7 and fed to the target vessel 21. The metering opening 7 which is now empty is moved on to the second intermediate position 44 and may optionally be cleaned there by blowing out, for example.

The metering openings 7 can be exposed to negative pressure on the inside and through the respective filter element 8 where required. A negative-pressure-transmitting connection between the pressure channel 14 and a negative pressure source 15 is created for this purpose, at least in the filling position 41. The level of the negative pressure supplied by the negative pressure source 15 is set via a schematically indicated control unit 18 and this may take place through a suitable control, but also through a management system where necessary. In any event, the negative pressure set in such a manner is transferred through the pressure channel 14 and the filter element 8 into the metering opening 7 when the metering opening is in the upper filling position 41. The negative pressure draws the powder product 1 out of the product store 4 into the metering opening 7. The filter element 8 is of such dimensions in terms of its permeability and adapted to the product 1 that although it is permeable to air and therefore also pressure-transmitting, the powder product 1 is retained and prevented from passing through. Consequently, a metered quantity 2 of the powder product 1 is created which completely fills the metering opening 7 and which corresponds in terms of volume to the volume of the metering opening 7. The filling process may, optionally, be supported by an agitator, which is not depicted, in the product store 4. Depending on the level of the prevailing negative pressure and the properties of the product 1, in any event a given compression level of the product 1 results in the metering opening 7, so that a particular mass of the metered quantity 2 also follows from the predetermined volume of the metering opening 7.

The negative pressure applied may be maintained at the same or also at a reduced level until the ejection position 43 is reached, in order to prevent the metered quantity 2 from falling out of the metering opening 7 prematurely. However, the action of negative pressure is ended when the lower ejection position 43 is reached, at the latest, so that the metered quantity 2 in this case emerges from the metering opening 7 and is conveyed to the target vessel 21. This can be achieved by simply switching off the negative pressure action, so that the metered quantity 2 falls out of the metering opening 7 under its own weight. In the preferred embodiment shown, however, the metering opening 7 is acted upon in the ejection position 43 through the filter element 8 by overpressure rather than negative pressure. For this purpose, an overpressure-transmitting connection is created between the pressure channel 14 and an overpressure source 16. The level of the overpressure supplied by the overpressure source 16 is set just as in the aforementioned case of the negative pressure source via the schematically indicated control unit 18, which can once again take place through a suitable control but possibly also through a management system. In any event, the overpressure set in this manner is transferred through the pressure channel 14 and the filter element 8 into the metering opening 7 when the metering opening is in the lower ejection position 43. The overpressure blows the metered quantity out of the metering opening 7. In addition, the action of the overpressure may still be used in the following second intermediate position 44 for the cleaning action of the empty metering opening 7 that takes place there.

The seal 13 arranged between the filter element 8 and the filter strip 11 is an elastomer cured onto the filter strip 11. Curing denotes the creation of a permanent, captive connection between a metal and an elastomer, for example, during the crosslinking of the basic material to the elastomer. The molecular cross-linking is also simultaneously used for the production of a substance-bonded connection.

Figure 2:
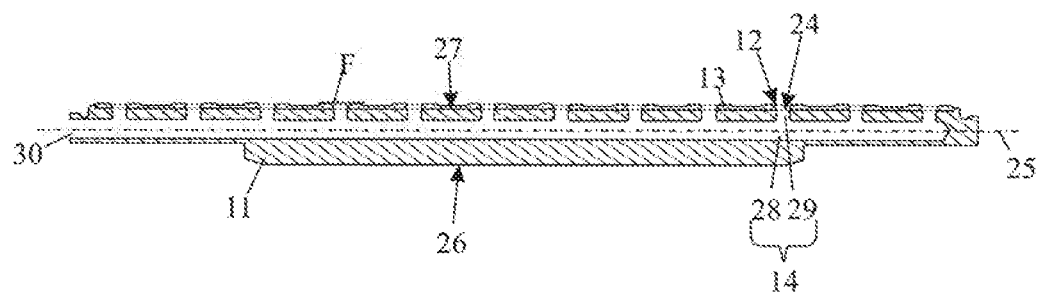
FIG. 2 shows one of the filter strips with seal from FIG. 1 in a schematic section along the sectional line II-II shown in FIG. 3; and, FIG. 3 shows the filter strip with seal from FIG. 2 in a schematic side view.
Figure 3:
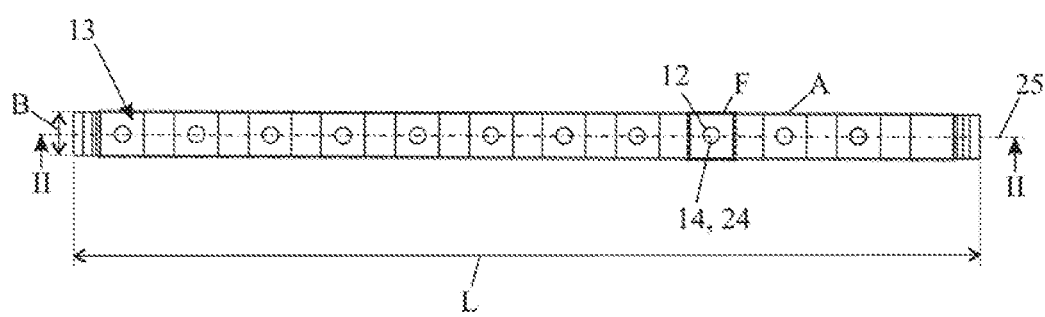

FIG. 2 shows the filter strip 11 in a section along the section line II-II depicted in FIG. 3. The section line II-II runs along the longitudinal axis 25 of the main channel 28 of the pressure channel 14. The branches 29 of the pressure channel 14 run perpendicularly to the longitudinal axis 25 and connect the main channel 28 to channel openings 24. The filter strip 11 has at least two channel openings 24. The at least two channel openings 24 lie alongside one another in the direction of the longitudinal axis 25 or in the direction of the rotational axis 19. In the embodiment the filter strip 11 has twelve channel openings 24. The channel openings 24 open out into the metering openings 7 and are likewise delimited by the filter elements 8. The main channel 28 is connected by its end 30 facing away from the branches 29 to the negative pressure source 15 in the filling position 41 and to the overpressure source 16 in the ejection position 43.

The filter strip 11 has a lower side 26 which faces the clamping core 10, as depicted in FIG. 1. An upper side 27 of the filter strip 11 faces the inner side 23 of the roller jacket 9. The seal 13 configured as a cured-on elastomer is attached to the upper side 27 of the filter strip 11.

During production of the seal 13, even before the channel openings 24 of the pressure channel 14 are introduced into the filter strip 11, virtually the entire upper side 27 of the filter strip 11, including the points at which the channel openings 24 are provided, is covered with the cured-on elastomer. Holes 12 are then introduced into the cured-on elastomer. The channel openings 24 are also produced during the same production step. The cured-on elastomer and the filter strip 11 in the region between the elastomer and the main channel 28 are drilled in a single drilling action. The holes 24 pass through the cured-on elastomer in a direction perpendicular to the longitudinal axis 25, or radially to the rotational axis 19, and connect the channel openings 24 to the metering openings 7.

FIG. 3 shows the filter strip 11 and the seal 13 in a view from above, perpendicular to the longitudinal axis 25, of the seal 13. The filter strip 11 has a connection surface A which faces the seal 13. As can be seen in FIG. 3, the connection surface A covers the seal 13 virtually completely. The outline of the concealed connection area is drawn using dotted lines in FIG. 3. The connection area A extends over at least 90% of a length L of the filter strip 11 measured in the direction of the longitudinal axis 25 of the filter strip 11. In the direction perpendicular to the longitudinal direction 25 along a partial section of the circumference of the inner side 23 of the roller jacket 9 depicted in FIG. 1, the connection area A extends over the entire width B of the filter strip 11.

The cured-on elastomer extends over the entire connection area A of the filter strip 11 facing the inner side 23 of the roller jacket 9 and is only pierced by the holes 12 for the fluidic connection of the pressure channel 14 to the metering opening 7. The single seal 13 formed by the elastomer cured onto the filter strip 11 seals the connection of a single channel opening 24 to a metering opening 7 assigned to the respective channel opening 24. In the embodiment, the seal 13 seals the connection of twelve channel openings 24 to twelve metering openings 7.

The diameters of the holes 12 are all the same in the embodiment. However, it may also be provided that the diameters of the holes 12 are of different sizes. Adjacent holes 12 are arranged at the same distance from one another measured in the direction of the longitudinal axis 25. However, different spaces may also be provided between adjacent holes 12. As can be seen in FIGS. 1 and 2, the diameter of the hole 12 is at least as large as the diameter of the channel opening 24.

As shown in FIG. 3, the pressure channel 14 has the channel opening 24 at its end facing the inner side 23 of the roller jacket 9. The channel opening 24 lies at the end of a branch 29 of the pressure channel 14. In a region about the channel opening 24, the cured-on elastomer has a pressure surface F for pressing the filter element 8 on the inner side 23 of the roller jacket 9. The pressure surface F faces away from the upper side 27 of the filter strip 11. As can be seen from FIGS. 1 to 3, in particular from FIG. 2, the pressure surface F projects in the direction of the inner side 23 of the roller jacket 9. The external outline of the pressure surface F is rectangular. It may also be provided, however, that the external outline of the pressure surface has a different shape.

The external outline may be round or circular, for example. The holes 12 are arranged within the pressure surfaces F. In the embodiment, the holes 12 are arranged in the middle of the pressure surfaces F. An edge length of the rectangular pressure surface F is at least twice as great as the diameter of the hole 12. The edge lengths of the pressure surface F are smaller than four times the diameter of the hole 12. In the embodiment the pressure surface F extends over the entire width B of the filter strip 11.

The cured-on elastomer may be any suitable elastomer, in particular nitrile rubber. In the embodiment, the cured-on elastomer is cured-on silicon. The filter strip 11 is made of metal. The filter strip 11 can preferably be made of aluminum.

It is understood that the foregoing description is that of the preferred embodiments of the invention and that various changes and modifications may be made thereto without departing from the spirit and scope of the invention as defined in the appended claims.

What is claimed is:

1. A metering roller for filling a target vessel with a portion of a powder product to be metered, the metering roller comprising:
   a roller jacket having an inner side and an outer side;
   a filter element;
   a filter strip;
   a seal;
   a clamping core;
   said roller jacket defining at least one metering opening completely penetrating said roller jacket from said outer side to said inner side;
   said at least one metering opening being delimited inside via said filter element;
   said filter element being pressed by said clamping core via said filter strip against said inner side of said roller jacket;
   said seal being arranged between said filter element and said filter strip;
   said at least one metering opening being exposed to a negative pressure through said filter element via at least one pressure channel in said filter strip;
   said seal sealing a connection of said at least one pressure channel to said metering opening; and,
   said seal being an elastomer cured onto said filter strip.

2. The metering roller of claim 1, wherein said cured-on elastomer extends over a total connection surface of said filter strip facing said inner side of said roller jacket and is only pierced by a hole for a fluidic connection of said at least one pressure channel to said metering opening.

3. The metering roller of claim 1, wherein:
   said at least one pressure channel has a first end facing said inner side of said roller jacket;
   said at least one pressure channel has a channel opening at said first end;
   said cured-on elastomer has a pressure surface for bearing against said inner side of said roller jacket in a region about said channel opening; and
   said pressure surface projects in a direction of said inner side of said roller jacket.

4. The metering roller of claim 3, wherein:
   said roller jacket defines a rotational axis;
   said filter strip has at least two channel openings which lie alongside one another in a direction of the rotational axis of said roller jacket; and,
   said pressure surfaces of said cured-on elastomer have a rectangular configuration.

5. The metering roller of claim 1, wherein:
said roller jacket defines a rotational axis; and,
said filter strip has at least two channel openings which lie alongside one another in a direction of the rotational axis of said roller jacket.

6. The metering roller of claim 1, wherein the cured-on elastomer is cured-on silicon.

7. The metering roller of claim 1, wherein the filter strip is made of aluminum.

* * * * *